Sept. 6, 1932.   H. W. KING   1,876,245
LIQUID DEPTH INDICATING DEVICE
Filed Jan. 3, 1927
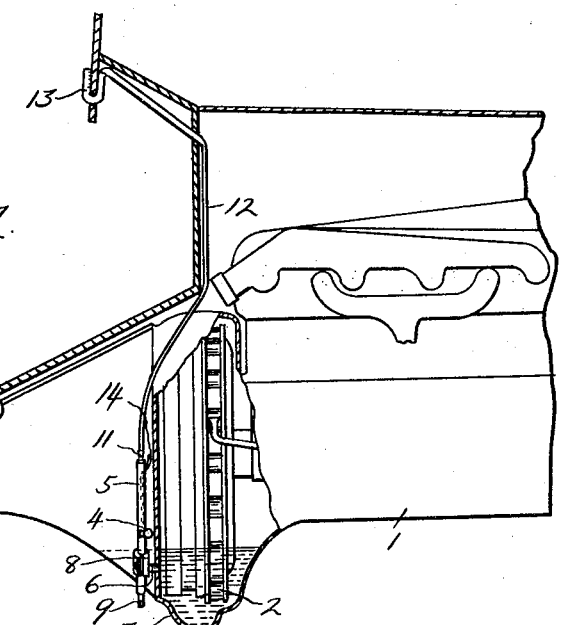
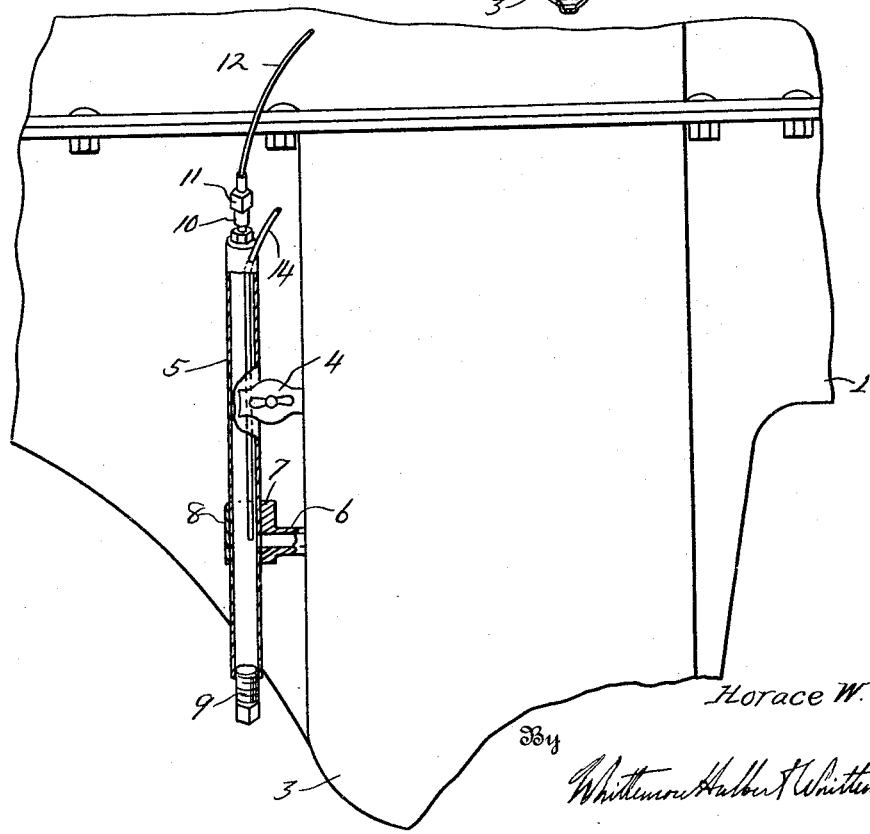
Inventor
Horace W. King
By
Attorneys Patented Sept. 6, 1932

1,876,245

UNITED STATES PATENT OFFICE

HORACE W. KING, OF BERKELEY, CALIFORNIA, ASSIGNOR TO KING-SEELEY CORPORATION, OF ANN ARBOR, MICHIGAN, A CORPORATION OF MICHIGAN

LIQUID DEPTH INDICATING DEVICE

Application filed January 3, 1927. Serial No. 158,686.

The invention relates to liquid depth indicating devices and refers more particularly to devices for indicating the depth of oil in an engine crank case. One of the objects of the invention is to provide a simple oil depth indicating device which may be cheaply manufactured and which will correctly register the depth of oil or its equivalent in quantity within the engine crank case. Another object is to provide an oil depth indicating device with means for supplying air to the air chamber, the parts being so arranged that the supplying of air is dependent upon the flow of the oil from the crank case during the operation of the engine. A further object is to provide an oil depth indicating device with means dependent upon the rotation of the engine fly wheel for introducing air into the air chamber. With these as well as other objects in view, the invention resides in the novel features of construction and combinations and arrangements of parts as more fully hereinafter set forth.

In the drawing:—

Figure 1 is a longitudinal section through a portion of an engine, to which is applied an oil depth indicating device embodying my invention;

Figure 2 is an enlarged side elevation of a portion thereof.

It has been found essential in liquid depth indicating devices to replenish their air chambers with air to compensate for absorption of the air contained within these air chambers by the liquid being measured. This also holds true with oil depth indicators and in order to provide for the supplying of air to the air chamber and at the same time to make the device simple and capable of being economically manufactured, I have devised the following construction:

1 is the crank case of an internal combustion engine of a standard make of automobile and 2 is the fly wheel which is located within the bell 3 at the rear end of the crank case and is designed to dip into the oil contained within the bell and to carry this oil upwardly to an elevated point from which it may flow to other parts of the engine requiring lubrication. The depth of the oil within the bell is normally determined by upper and lower pet cocks in the rear end of the bell, the upper pet cock 4 being shown. 5 is the air chamber which is in the nature of a tube at the rear side of the bell. The air chamber extends upwardly and is connected to the bell by the nipple 6 taking the place of the lower pet cock above referred to. The nipple also supports the air chamber, it having the head 7 for cooperating with the clamp 8 to secure the air chamber in place. The lower end of the air chamber is closed as by means of the plug 9 which is threaded into the tube forming the air chamber. The upper end of the air chamber is suitably connected by the nipple 10 and union coupling 11 to the air pressure transmitting pipe 12 which is connected to one leg of the U-pressure gage 13. 14 is the vent or relief tube having an open upper end above the level of oil within the bell 3 and an open lower end communicating with the air chamber 5, preferably at the same elevation as the passage through the nipple 6. This vent or relief tube, as shown, extends into the air chamber near its upper end and thence downwardly therewithin, the joint between the vent or relief tube and the air chamber being sealed to prevent any escape of air from the air chamber.

In operation starting of the engine and consequent rotation of the fly wheel 2 produces a flow of oil from the bell 3, some of this oil being carried upwardly by the fly wheel and thence directed to other parts of the engine. This flow of oil from the bell is at times sufficient to uncover the passage in the nipple 6, thus placing the lower end of the air chamber in communication with the air allowing the oil within the air chamber to be drained out and air to enter the air chamber to replace the oil. The vent or relief tube 14 functions to keep the minimum pressure within the air chamber at substantially atmospheric pressure and thereby prevents creation within the air chamber of a sufficient suction effect to draw the indicating liquid from the U-pressure gage 13, it being evident that when the flow of oil creates a suction effect air is allowed to enter the air chamber also through the vent or relief tube. Upon stopping of the engine the oil flows back to the bell 3 and at this time the pressure of the air within the air chamber being transmitted to the pressure gage may be used to correctly indicate the depth of oil or, if desired, the quantity of oil in gallons within the bell.

What I claim as my invention is:

1. In a device for indicating the depth of oil in an engine crank case, the combination with an air chamber communicating with the crank case, a pressure gage, means whereby said gage communicates with the air space of said chamber, and means dependent upon the lowering of the oil level in the crank case for introducing air into said air chamber.

2. In a device for indicating the depth of oil in an engine crank case, the combination of an air chamber communicating with the crank case, a pressure gauge, means for establishing communication between said gauge and the air space of said chamber, means dependent upon the depression of the oil level in the crank case for introducing air into said air chamber, and an engine fly wheel adapted upon rotation to depress the level of the oil in the crank case.

3. In a device for indicating the depth of oil in an engine crank case, the combination with an air chamber communicating with the crank case, a pressure gage, means whereby said gage communicates with the air space of said chamber, and means dependent upon rotation of the engine fly wheel and the lowering of the oil level in the crank case incident thereto for introducing air into said air chamber, said means including an air vent tube having an opening to the air above the level of oil within said crank case and opening into said air chamber adjacent to the point of communication of said air chamber with said crank case.

4. In a device for indicating the depth of oil in an engine crank case having a bell within which the engine fly wheel is located, the fly wheel dipping into the oil within the bell, the combination with a tubular member forming an air chamber at one side of the bell, means for placing the interior of said tubular member in communication with the bell, a pressure gage, means for placing said pressure gage in communication with the upper portion of said tubular member, and an air vent tube having an open upper end above the level of oil within the bell and an open lower end terminating within said tubular member adjacent to said first mentioned means.

5. In a device for indicating the depth of oil in an engine crank case from which oil is withdrawn during the operation of the engine, the combination with an air chamber communicating with the crank case at a point normally below the level of oil within the crank case when the engine is not in operation, but at a point above the level of oil within the crank case when the engine is in operation, said air chamber being closed to the atmosphere when the engine is not in operation, a pressure gage, and means for placing said pressure gage in communication with said air chamber above the level of oil therewithin.

6. In a device for indicating the depth of oil in an engine crank case, the combination with an engine part movable in said crank case and causing a disturbance of the oil, of an air chamber adjacent the crank case and communicating with the oil therein at a pressure transmitting level, a pressure gauge, means whereby said gauge communicates with said air chamber, and means dependent upon the disturbance of the oil and the lowering of the oil level caused thereby for introducing air into said air chamber.

7. In a device for indicating the depth of oil in an engine crank case, the combination with a rotatable engine part in said crank case adapted to cause movement of the oil, of an air chamber adjacent the crank case communicating with the oil therein at a pressure transmitting level, a pressure gauge, means whereby said gauge communicates with said air chamber, and means dependent upon the movement of the oil and the lowering of the oil level caused thereby for introducing air into said air chamber.

8. In a device for indicating the depth of oil in an engine crank case adapted to contain oil at various levels, the combination with an air chamber, means for placing said air chamber in communication with the crank case, a pressure gage, means for placing said gage in communication with said air chamber, and means dependent upon a drop in the level of the oil in the crank case below a predetermined point for replenishing the air chamber with air whereby said gage operates to indicate the various levels of the oil in the crank case from its normal level to substantially the predetermined point aforesaid.

In testimony whereof I affix my signature.

HORACE W. KING.